W. V. D. KELLEY.
MOTION PICTURE FILM.
APPLICATION FILED JULY 8, 1918.
1,337,775. Patented Apr. 20, 1920.
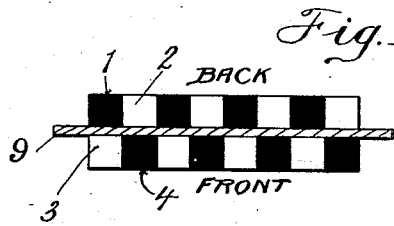
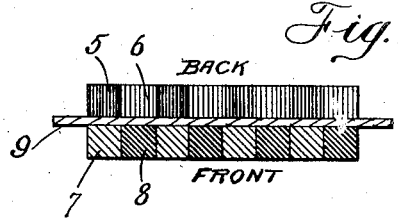
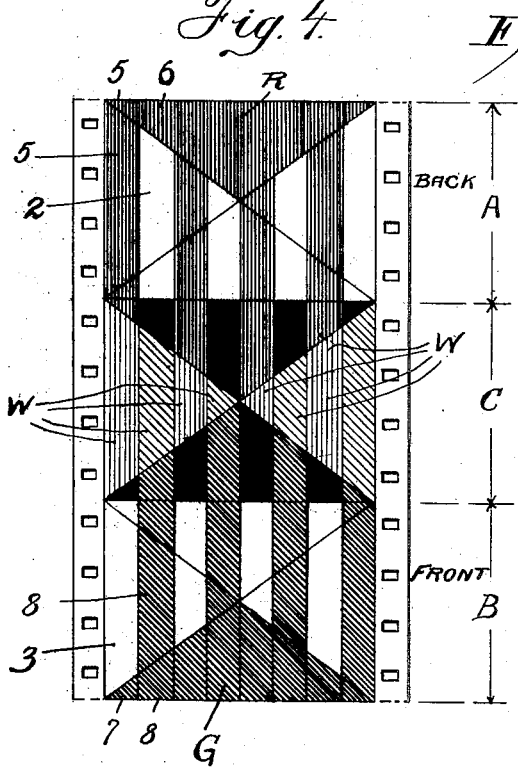
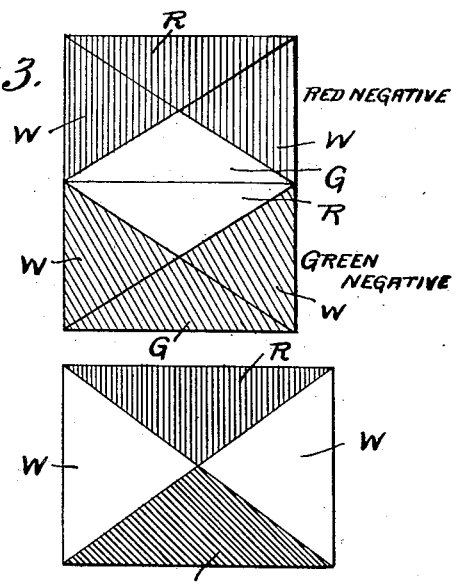
INVENTOR
William V. D. Kelley
BY
Lewis J. Doolittle
ATTORNEY

UNITED STATES PATENT OFFICE.

WILLIAM V. D. KELLEY, OF NEW YORK, N. Y., ASSIGNOR, BY MESNE ASSIGNMENTS, TO PRIZMA INCORPORATED, A CORPORATION OF MAINE.

MOTION-PICTURE FILM.

1,337,775.   Specification of Letters Patent.   Patented Apr. 20, 1920.

Application filed July 8, 1918. Serial No. 243,879.

*To all whom it may concern:*

Be it known that I, WILLIAM V. D. KELLEY, a citizen of the United States, and resident of the city, county, and State of New York, have invented certain new and useful Improvements in Motion-Picture Films, of which the following is a specification.

This invention relates to an improved method of producing positive color picture films, particularly films for use in connection with a projecting machine for producing motion pictures in natural colors. The object of the invention is primarily to produce a film which may be used in the standard apparatus and at the usual speed.

In carrying out the invention I use a double coated film carrying color-value images or impressions on each side which are converted to pictures in colors, the colors being reproduced additively and in this respect differing from previously known methods which use the subtractive principle, as will appear from the description hereinafter.

The positive film is double coated or provided with a light sensitive emulsion on both sides. The first step in the process is to expose this film to light through a screen composed of lines, dots, etc., arranged in a symmetrical design presenting symmetrically arranged openings through which the light passes to reproduce the design in black and white on the film, successive spaces on both sides of the film, corresponding to the successive pictures, being thus exposed.

For the purpose of illustrating, the design selected for the screen is composed of straight lines extending longitudinally of the film and parallel to each other, the alternate spaces between the lines being of the same width as the lines. In the drawings these lines and spaces have been greatly enlarged and exaggerated in order to more clearly show the arrangement. Both sides of the double coated film are exposed through this line screen but the screens used on opposite sides of the film are arranged so that the lines exposed on one side exactly correspond or register with the unexposed spaces between the lines of the screen of the opposite side of the film and both exposures are of a sufficient density which will not be appreciably affected when the same is subsequently exposed for printing pictures thereon from the picture negative film, as will be hereinafter described.

The picture negative film may be made in the usual manner through color screens so that the pictures are arranged alternately in a succession of sets or pairs of complementary color-values, one picture of each pair, for instance, being composed of a red-orange and the other of blue-green.

The positive film, which has been previously exposed through the line screen as described, is now exposed or printed on both sides from this negative film, the printing apparatus being arranged for this type of film to advance the negative film two spaces or pictures while the positive is advanced one, so that all of the successive pictures produced or printed on one side of the positive film are printed from the red-orange pictures and on the opposite side of the positive film, which is exposed and printed in a like manner, from the blue-green pictures. The pictures thus printed on opposite sides of the film are, as will be seen, of complementary color-values and are printed in the alternate spaces between the lines produced on the positive film by the first exposure through the line screen, as before described, and, the spaces in which the picture is printed on one side of the film correspond or register with the lines on the opposite side for each picture.

This positive film is next developed and fixed in the usual manner and then both the lines and images on both sides are colored, by any of the usual toning, dyeing or mordanting methods, to produce complementary colors corresponding to the color-value of the picture on the opposite side of the film. For instance, the lines and picture on the side containing the red-orange picture are colored blue-green and and on the opposite side, containing the blue-green picture, are colored red-orange.

It will thus be seen that, as the lines on one side of the film correspond or register with the picture or image sections on the opposite side, the additive colors required for each picture section are supplied by the colored lines on the opposite side and as the colors forming the picture cover such lines we get the result of the mixture of the complementary colors on opposite sides of the film. In portions having full density this would be black. In lesser densities the combination will run all the way from the pure color of the line through the various mixtures of the two complementary colors, thus producing the different colors in natural shades in the projected picture.

By this additive method white is produced by impressing or exciting the eye with a mixture of two complementary colors of equal intensities, produced by the oppositely positioned and adjoining red and green-blue lines only, while black is subtractively produced by a full density section of the picture or image on one opposite or covering the complementary colored line on the opposite side; for instance, a full density of the red or red-orange image over the green or green-blue lines, or the green image over the red lines produces black in that portion of the picure; and the intermediate colors are additively produced by the different proportions and relative densities of the colors of the images and lines.

In the drawings, Figure 1 is a cross sectional view, greatly enlarged and exaggerated, of the positive film.

Fig. 2 is a view similar to Fig. 1.

Fig. 3 is a face view of a portion of the negative film, showing successive red and green-blue color-values in conventional form.

Fig. 4 is a face view of a portion of the completed positive film.

Fig. 5 is an illustration of the combined color effects in one picture or image when projected, corresponding to the object from which the negatives of Fig. 3 are made.

The first step in the process of producing the positive color picture film is shown in Fig. 1, in which the effect and arrangement of the exposure through the line screen (selected for illustration) is shown. The emulsion on one side of the film is printed with alternate black and white lines or sections, which are shown greatly enlarged and exaggerated at 1 and 2, and on the opposite side of the film the emulsion is likewise printed with alternate white and black sections or lines 3 and 4. The emulsion is coated or carried on both sides of a base 9, made of suitable material in the usual manner, and the black and white sections or lines on the opposite sides are printed and arranged so that an exposed section or line, such as 1, is opposite an unexposed section or line, such as 3, and the adjacent unexposed section 2 is opposite the exposed section 4, etc.

The next step is the printing of the picture or image on both sides of the positive film from the negative film illustrated in Fig. 3, in which some of the color-values of one of the sets or pairs of the picture negative have been indicated in conventional form. One side of the positive film is printed in the unexposed sections, such as the front 3 in Fig. 1, from the alternate red or red-orange color-value pictures of the negative film shown in Fig. 3 and the unexposed sections on the back side of the film, such as 2 in Fig. 1, are printed from the alternate green-blue color-value pictures of the negative film.

It will be understood that the conventional showing of the picture negative is merely illustrative of certain of the extreme colors or color-values and that the different colors and shades of color between these colors of the spectrum are obtained by the additive mixing of the different relative densities of the colors of the opposite side of the positive film printed from the corresponding pictures of the sets or pairs of color-values of the negative film.

The positive film is then colored on each side, both the line and printed picture sections being colored, with colors complementary to the color-values of the pictures printed thereon. This is illustrated in Fig. 2, the line sections 5 and the picture sections 6, the latter containing the impression from the green-blue picture of the negative, being colored red or red-orange and in the same manner the opposite side of the film containing the picture sections 7, carrying the impression from the red or red-orange color-value pictures of the negative film, and the line sections 8 are colored green or green-blue.

In Fig. 4 the combined result of the mixing of the complementary colors on the opposite sides of the film is shown and in Fig. 5 the projected picture is conventionally illustrated.

These can be explained as follows, although it will be understood that it is impossible to show in black and white ink just how the section C made up on the back of an image printed from the green-blue (lower) negative of Fig. 3 and lines 1, colored red, section A, Fig. 4; and on the front of an image from the red-orange (upper) negative of Fig. 3, and lines 4 colored green, section B, Fig. 4; actually shows in transmitted light.

By referring to Fig. 5, it is seen that the object to be reproduced is the two white sectors W, W, and the red sector R, and green sector G. In Fig. 4, section C, the sectors W are additively obtained in white by the narrow alternating bands of pure red-orange (5 in Fig. 2) and pure green-blue (8 in Fig. 2). The section R in section C, Fig. 4 consists of the print on the back from the green-blue negative colored red, as modified by the green colored lines 8 on the front, which still additively gives red or red-orange, even though where the green lines overlie the red colored print, narrow bands of black occur. The green sector G is likewise reproduced by narrow bands of green alternating with black. Likewise other colors will be produced additively to the eye by the resultant stimulation thereon of the variations between solid black and red or green according to the coloring of each image complementary to the color recorded thereby. The colors can only be obtained additively since the partial images on each coating together constitute but a single image, and overlying each image section in either coating is only a band of pure color, constituting a filter for the image. The production at places of black by total stoppage of projecting light does not affect the color stimulation produced in the eye by adjoining areas of pure color, because to the eye the color will overcome the black, except where black in the object is to be reproduced.

It will be understood that the arrangement herein described and shown is for the purpose of illustration only and that the invention is also equally applicable to color photography generally, either for motion pictures or still pictures, or for single plate or film pictures, etc.

What I claim is:—

1. The method of producing a color picture which consists in providing a transparent support with a plurality of sensitive coatings, having insensitive designs therein, printing images from color value negatives in the sensitive portions of said designs, and applying predetermined colors to said coatings in such manner that natural colors are additively produced in projection.

2. The method of producing color pictures which consists in providing a transparent support with a plurality of coatings, providing designs therein composed of alternating spaces and solid portions capable of being colored, the spaces of each design being sensitive and registering with the solid portions of the other, printing color value images in the spaces of said designs, and coloring the developed images and the accompanying solid portions with colors complementary to the colors recorded by the images.

3. The method of producing color pictures which consists in providing a transparent support with a plurality of coatings, printing designs thereon composed of alternating spaces and solid portions, the spaces of one design registering with the solid portions of the other, then printing from color value negatives in the respective space portions of each coating, and coloring the developed images and accompanying design with colors bearing a predetermined relation to the colors recorded by the images.

4. The method of producing color pictures which consists in providing a transparent support with a plurality of coatings, printing designs thereon composed of alternating spaces and solid portions, the spaces of one design registering with the solid portions of the other, then printing from color value negatives in the respective space portions of each coating, simultaneously developing both designs and images, and coloring the developed images and accompanying design with colors bearing a predetermined relation to the colors recorded by the images.

5. The method of producing color picture films which consists in printing both sides of a double coated film with a design composed of symmetrically arranged exposed and unexposed portions, printing in said unexposed portions pictures having complementary color values for the pictures on opposite sides of said film, and coloring the opposite sides of said film with complementary colors.

6. The method of producing color picture films which consists in printing both sides of a double coated film with a design composed of symmetrically arranged exposed and unexposed portions, printing in said unexposed portions pictures having complementary color values for the pictures on opposite sides of said film, and coloring the opposite sides of said film with complementary colors corresponding to the color value of the picture on the opposite side of the film.

7. The method of producing color picture films which consists in printing both sides of a double coated film with a design composed of symmetrically arranged exposed and unexposed portions, the exposed portions on one side being arranged opposite the unexposed portions on the opposite side of the film, printing in said unexposed portions pictures having complementary color values for the pictures on opposite sides of said film, and coloring the opposite sides of said film with complementary colors corresponding to the color value of the picture on the opposite side of the film.

8. A color picture film carrying on both sides like impressions consisting of a design composed of symmetrically arranged portions with the picture printed between said portions, said impressions being colored on both sides in colors which when mixed additively reproduce an impression in natural colors.

9. A color picture film carrying on both sides like impressions consisting of a design composed of symmetrically arranged portions with the picture printed between said portions, said impressions being relatively positioned on opposite sides of the film with the picture portion on one side opposite the design portion on the opposite side and colored with complementary colors on opposite sides.

10. A color picture film carrying on both sides like impressions consisting of a design composed of symmetrically arranged portions with color value pictures between said portions having complementary color values for the pictures on opposite sides of said film, said impressions being relatively positioned on opposite sides of the film with the picture portion on one side opposite the design portion on the opposite side and colored with complementary colors on opposite sides.

11. A color picture film carrying on both sides like impressions consisting of a design composed of symmetrically arranged portions with color value pictures between said portions having complementary color values for the pictures on opposite sides of said film, said impressions being relatively positioned on opposite sides of the film with the picture portion on one side opposite the design portion on the opposite side and colored with complementary colors on opposite sides corresponding to the color value of the picture on the opposite side of the film.

12. A color picture transparency comprising a support having a plurality of coatings each containing a partial image in a finely subdivided pattern, the pattern composed of spaces and image portions, and arranged respectively so that the spaces in one coincide with the image portions in the other constituting together a single image, each coating being so colored as to constitute a filter for the image portions in the other coating.

13. A color picture transparency having half of a colored, regularly subdivided color value image comprising spaces and image sections on one side of a base, and displaced on the other side half of another colored regularly subdivided color value image also comprising spaces and image sections, the spaces on one side backing the image sections on the other side and carrying, respectively, a plain color complementary to the color of the image opposite thereto.

14. A picture transparency consisting of a toned subdivided image alternating with color filter sections on one side of a double coated base, registering with similarly arranged elements on the opposite side, differently colored, the whole coöperating to form a single picture additively giving substantially natural colors upon viewing.

Signed at the city, county and State of New York, this 29th day of June, 1918.

WILLIAM V. D. KELLEY.